UNITED STATES PATENT OFFICE.

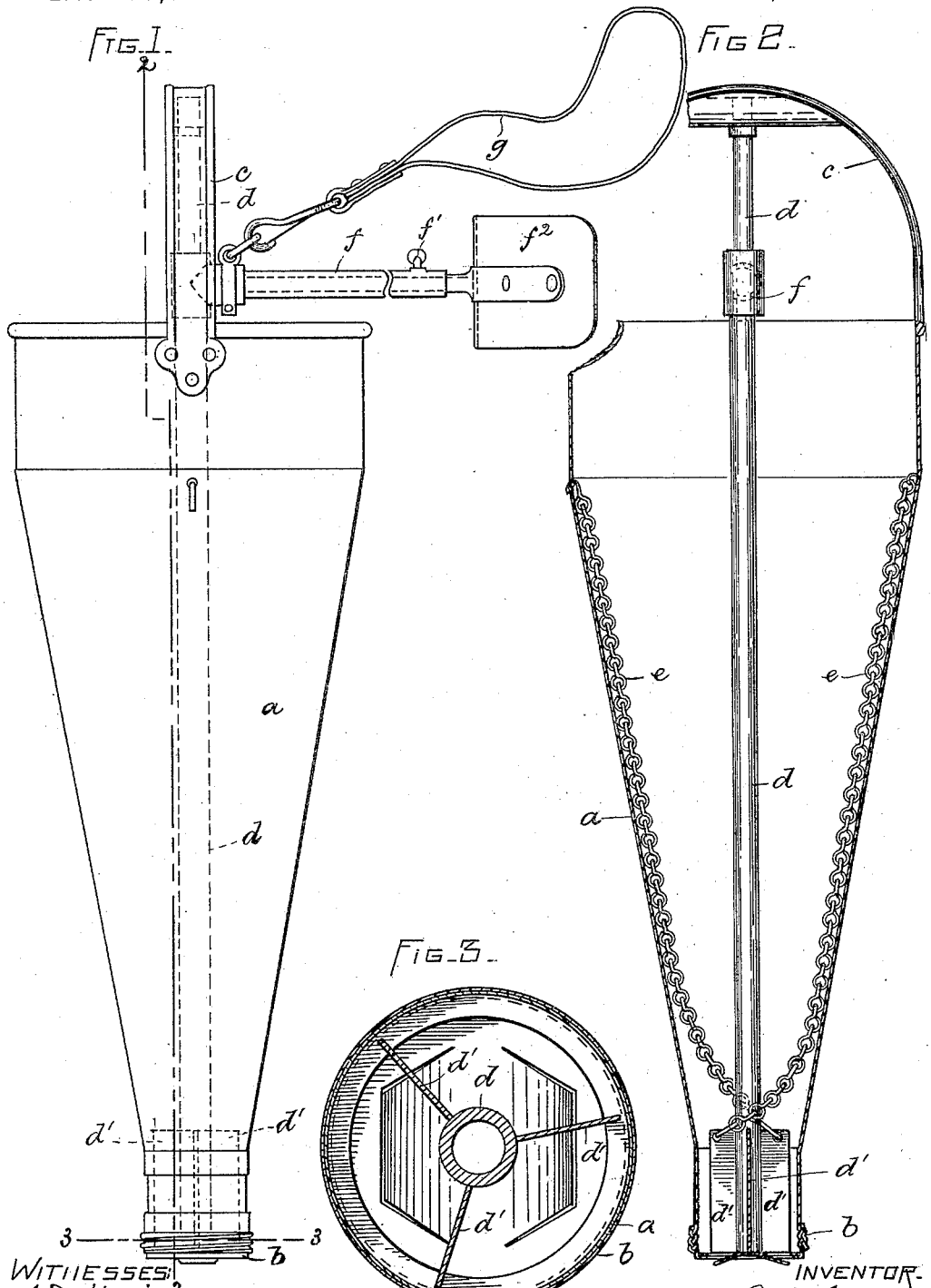

CHARLES D. CUTTS, OF FORT FAIRFIELD, MAINE.

FERTILIZER-DISTRIBUTER.

SPECIFICATION forming part of Letters Patent No. 469,370, dated February 23, 1892.

Application filed April 30, 1891. Serial No. 391,039. (No model.)

*To all whom it may concern:*

Be it known that I, CHARLES D. CUTTS, of Fort Fairfield, in the county of Aristook and State of Maine, have invented certain new and useful Improvements in Fertilizer-Droppers, of which the following is a specification.

This invention has for its object to provide a fertilizer or plaster dropper and seed-planter which may be carried by a person with ease and which is of simple construction and adapted to be adjusted so as to allow of the escape of its contents more or less rapidly, as may be desired, and provided with agitating devices, so that the said contents may be caused to run freely from the device.

The invention consists in the improvements which I will now proceed to describe and claim.

In the accompanying drawings, forming a part of this specification, Figure 1 represents a side elevation of my improved fertilizer or seed dropper. Fig. 2 represents a section on line 2 2 of Fig. 1. Fig. 3 represents a section on line 3 3 of Fig. 1.

The same letters of reference indicate the same parts in all the figures.

In the drawings, $a$ represents a hopper, preferably of tapering form, forming the main portion of my improved fertilizer or seed dropper, said hopper $a$ being preferably open at its upper and wider end and having an external screw-thread on its lower and smaller end to receive a cap $b$, screw-threaded on its interior and adapted to fit over said lower end of the hopper. The cap $b$ is provided in its bottom with openings, which are made by making slits or cuts in the material of which said bottom is composed, leaving a piece or pieces in the form of a tongue attached at one edge to the main part of the cap and capable of being bent back from the same, so as to form outlets of more or less size, as may be desired. The hopper $a$ is provided at its upper end with a handle $c$, which also forms an upper end bearing for a rod or shaft $d$, next described. The rod $d$ runs through the center of the hopper $a$, said rod having an end bearing for its upper end in the said handle $c$. The lower end of the rod or shaft $d$ is provided with outwardly-projecting wings $d'$ $d'$. The lower edge of the hopper $a$ is preferably turned slightly inward, forming an annular flange, on which the outer lower corners of the wings $d'$ are adapted to rest, thus preventing the rod $d$ and its wings $d'$ from dropping out of the hopper when the cap $b$ is removed therefrom. The rod $d$ is adapted to rotate in its bearings in the handle $c$, so that it may rotate in said hopper, or, rather, said hopper may be rotated upon said rod, and the wings $d'$ will co-operate therewith in agitating the contents of the hopper and will cause the same to drop freely through the openings in the cap $b$. To the upper outer corners of the wings $d'$ are affixed the lower ends of the chains $e$, the upper ends of said chains being attached to the side of the hopper $a$ near the top thereof. Said chains are not quite taut between the points, so as to permit of the rotation of the hopper on the rod and serve as agitating devices when the hopper is so rotated, as will be readily seen.

$f$ represents a body-brace, which is screwed or otherwise affixed to the rod $d$ near the upper end thereof. Said brace is preferably made in two sections, the one sliding within the other, the hollow or sleeve section being provided with a set-screw $f'$, by which the brace can be fixed at any desired adjustment. The outer end of the brace $f$ is provided with a curved piece $f^2$, adapted to give an extended bearing on the body of the user of the device.

$g$ represents a shoulder-strap, which is affixed to the rod $d$ in any suitable way. The shoulder-strap $g$ is preferably adjustable, so that it may be varied in length to suit the user and the length to which the brace $f$ may be adjusted. The brace $f$ is preferably firmly affixed to the rod $d$, so that the latter cannot rotate independently of the former. It will be seen, therefore, that the brace being placed against the body and the shoulder-strap adjusted over the shoulder of the user the hopper will be supported at a greater or less distance from the body without any help from the hands of the user, thus leaving the latter free. It will be obvious that when in this position the hopper $a$ may be caused by the handle $c$ to partially rotate upon the rod $d$ in one direction, thus causing the agitating devices on said rod to agitate the contents of the hopper and cause the same to drop through the openings in the lower end of the hopper.

The device is designed principally for use with phosphate fertilizers in planting potatoes or the like, the device being used to distribute a small quantity of the fertilizer around each seed planted. It may, however, be used for other purposes—for example, for distributing plaster or other protector against insects over the young plants of potatoes or the like. It may also be used as a seed-distributer.

The cap $b$ may be made with a false bottom, the same being removable, so that another having different apertures therein may be used, this construction enabling bottoms having different outlets to be used for the different fertilizers, &c., that may be carried in the hopper.

I do not limit myself to the form of outlet shown and above described, but may employ a sheet of metal as a false bottom having a number of small holes therein or any other suitable device.

I claim—

1. The improved fertilizer-dropper comprising a central rod or shaft having wings or projections at its lower end, and means connected directly with its upper end for supporting and holding it against rotation, and a tapering hopper having narrow openings at its lower end, as set forth.

2. The combination of a tapering hopper provided with outlets at its narrow end, a handle $c$ at its wider end, a central rod journaled in said handle and having on its lower end wings or projections, the same extending outwardly toward the interior of the narrow end of the hopper, a brace affixed to the said central rod, and a shoulder-strap attached to the same, whereby the device may be supported away from the body without being held by the hands, said hopper being rotatable on the central rod by means of the handle $c$, the said wings on the central rod thus agitating the contents of the hopper, so as to cause said contents to fall to the outlets at the bottom of the hopper, as set forth.

3. The combination of a tapering hopper provided with outlets at its narrow end, a handle $c$ at its wider end, a central rod journaled in said handle and having on its lower end wings or projections, the same extending outwardly toward the interior of the narrow end of the hopper, chains affixed at one end to the said wings or projections and at the other end to the upper portion of said hopper, a brace affixed to said central rod, and a shoulder-strap attached to the same, whereby the device may be supported away from the body without being held by the hands, said hopper being rotatable on the central rod by means of the handle $c$, the said wings and chains thus agitating the contents of the hopper, so as to cause said contents to fall to the outlets at the bottom of the hopper, as set forth.

4. The improved fertilizer-dropper comprising a tapering hopper having at its narrow end openings through which the contents of said hopper may pass in small quantities, a central rod or shaft in said hopper provided with suitable bearings and adapted to rotate independently of the hopper and having on its lower end wings or projections extending outwardly toward the interior of the narrow end of said hopper, and chains affixed at one end to said wings or projections and at the other end to the upper portion of said hopper, said wings and chains constituting a device whereby when the rod is rotated in the hopper the contents of the latter will be agitated and caused to fall to the outlets in the lower end of the same, as set forth.

5. The combination of a tapering hopper provided with outlets at its narrow end, a handle $c$ at its wider end, a central rod journaled in said handle and having on its lower end wings or projections, the same extending outwardly toward the interior of the narrow end of the hopper, and a brace affixed to the said central rod, said hopper being rotatable on the central rod by means of the handle $c$, the said wings on the central rod thus agitating the contents of the hopper, so as to cause said contents to fall to the outlets at the bottom of the hopper, as set forth.

In testimony whereof I have signed my name to this specification, in the presence of two subscribing witnesses, this 16th day of April, A. D. 1891.

CHARLES D. CUTTS.

Witnesses:
S. D. BECKWITH,
E. E. SCALES.